L. D. HOSSICK.
EGG POACHER.
APPLICATION FILED OCT. 5, 1917.
1,285,709.
Patented Nov. 26, 1918.
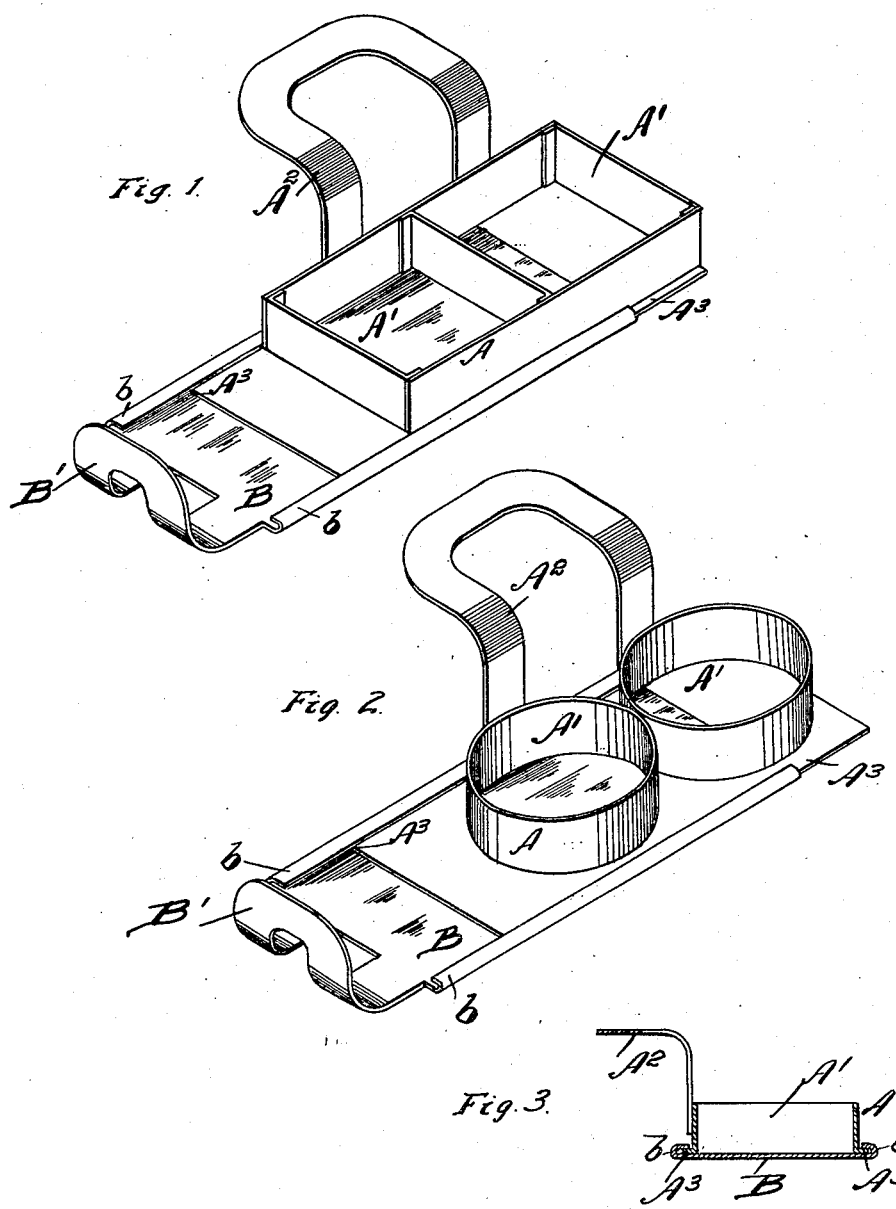
Inventor
Lloyd D. Hossick
By J. E. Thomas
Attorney

UNITED STATES PATENT OFFICE.

LLOYD D. HOSSICK, OF DETROIT, MICHIGAN.

EGG-POACHER.

1,285,709.

Specification of Letters Patent.    Patented Nov. 26, 1918.

Application filed October 5, 1917. Serial No. 194,840.

*To all whom it may concern:*

Be it known that I, LLOYD D. HOSSICK, citizen of the United States, residing at Detroit, county of Wayne, State of Michigan, have invented a certain new and useful Improvement in Egg-Poachers, and declare the following to be a full, clear, and exact description of the same, such as will enable others skilled in the art to which it pertains to make and use the same, reference being had to the accompanying drawings, which form a part of this specification.

My invention relates to an appliance for poaching eggs, shown in the accompanying drawings and more particularly described in the following specification and claims.

The object of this invention is to provide a simple and inexpensive device having one or more pockets of a conventional shape or form, each pocket being adapted to receive an egg for poaching, from which the eggs may be discharged upon separate pieces of toast so as to present a pleasing and appetizing appearance ready for delivery to the table.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, without departing from the spirit of the same.

In the drawings accompanying this specification:—

Figure 1, is a perspective view of the device showing the bottom plate partly drawn for discharging eggs therefrom.

Fig. 2, is a similar view of a modification.

Fig. 3, is a cross-sectional view through device.

Referring now to the letters of reference placed upon the drawings:—

A, denotes an open frame comprising a plurality of pockets A', of suitable form, each of which is designed to receive an egg to be poached.

$A^2$, is an upwardly extending handle secured to the frame and $A^3$, are flanges projecting from the sides of the frame supported in the channel-shaped edges $b$, of the bottom plate B,—with respect to which the frame has a slidable adjustment.

B', is a handle carried by the bottom plate for manually adjusting the latter.

Having indicated the several parts by reference letters, the construction and operation of the device will be readily understood. The slidable frame A, is first adjusted with reference to the plate B, so as to close the opening through the bottom of the respective pockets A'. An egg is then deposited in each of the pockets and the device placed in a vessel of water for poaching in the usual way.

When the eggs are properly poached the device may be removed from the water and the eggs separately discharged upon a plate, or pieces of toast as desired, upon adjusting the bottom plate with reference to the frame so as to permit the eggs to drop therefrom.

Having thus described my invention, what I claim is:—

1. In a device of the character described, a frame comprising a plurality of separate compartments having imperforated side walls and open only below for the discharge of their contents, whereby the leakage of the eggs from their respective compartments may be prevented during cooking, an imperforated slidable plate adapted to close the openings through the bottom of said compartments, and a handle rigidly secured to the frame extending in a lateral direction therefrom, whereby the hand of the operator grasping said handle to lift or support the device may not be directly above the compartments in said frame.

2. In a device of the character described, a frame consisting of a plurality of compartments having imperforated side walls and open below for the discharge of their contents after being cooked, said frame having laterally projecting flanges and an end projecting bottom portion outside the wall of the compartments, a slidable imperforated bottom plate adapted to close the openings through the compartments in the frame having inwardly directed channels along its side walls to receive the laterally projecting flanges of the frame, said bottom plate having a rearwardly extending handle integral therewith, and a handle rigidly secured to the frame extending in an upward and lateral direction therefrom, whereby the device may be held and operated from the side in order that the operator's hand may not be scalded by steam arising from the vessel employed in connection with the device.

In testimony whereof, I sign this specification in the presence of two witnesses.

LLOYD D. HOSSICK.

Witnesses:
S. E. THOMAS,
JOHN CONSIDINE, Jr.

Copies of this patent may be obtained for five cents each, by addressing the "Commissioner of Patents, Washington, D. C."